United States Patent [19]

Takahashi et al.

[11] Patent Number: 4,780,340

[45] Date of Patent: Oct. 25, 1988

[54] PRIMER PAINT OR PRIMER SURFACER COMPOSITION

[75] Inventors: Katsuhiko Takahashi; Yoshiharu Suzuki; Haruyasu Ito, all of Fuji, Japan

[73] Assignee: Polyplastics Co., Ltd., Osaka, Japan

[21] Appl. No.: 74,420

[22] Filed: Jul. 16, 1987

[30] Foreign Application Priority Data

Jul. 30, 1986 [JP] Japan ............................ 61-179430

[51] Int. Cl.[4] .................. B05D 3/02; C08L 63/00; C08L 1/08
[52] U.S. Cl. .................. 427/393.5; 427/412.1; 427/412.5; 523/448; 524/37; 524/38; 524/39; 524/41
[58] Field of Search .............. 524/37, 38, 39, 41; 427/322, 393.5, 412.1, 412.5; 523/448

[56] References Cited

U.S. PATENT DOCUMENTS

| | | | |
|---|---|---|---|
| 3,227,605 | 1/1966 | Wolinski | 427/322 |
| 3,326,742 | 6/1967 | Shepherd | 427/322 |
| 3,404,996 | 10/1968 | Deichert et al. | 427/322 |
| 4,532,177 | 7/1985 | Mahar | 524/38 |

OTHER PUBLICATIONS

T. Endo et al., J. Polym. Sci. Polym. Lett. Ed., 13 193(1975).
J. Polym. Sci., Polym. Chem. Ed., 13, 2525(1975).
Makrolol. Chem., 176, 2897(1975).
J. Polym. Sci., Polym. Chem. Ed., 14, 1735(1976).
Makromol Chem., 177 3231(1976).
J. Polym. J., 13 715(1981).
J. Polym. Sci. Polym. Chem. Ed., 19, 1283(1981).
Polym. J., 14, 485(1982).
J. Polym. Sci., Polym. Chem. Ed., 20, 2935(1982).
M. Shimbo, M. Ochi, T. Inamura, M. Inoue, J. Mater. Sci., 20 2965(1985).
J. Polym. Sci., Polym. Lett. Ed. 18, 457(1900).
Ibid., 18, 771(1980) N.Y., 1970.
M. Shimbo, M. Ochi, Y. Shigets, J. Appl. Polym. Sci., 26, 2265 (1981).

*Primary Examiner*—Lewis T. Jacobs
*Attorney, Agent, or Firm*—Nixon & Vanderhye

[57] ABSTRACT

A plastic article, in particular a highly crystalline plastic, can be effectively coated with a paint by using a primer composition comprising (A) a polyurethane, (B) a spiro-ortho-ester resin being capable of the ring-opening expansion, (C) a cellulose derivative and (D) a surfactant having a hydroxy group.

5 Claims, No Drawings

PRIMER PAINT OR PRIMER SURFACER COMPOSITION

The present invention relates to a primer paint or a primer-surfacer paint showing superior adhesion to surfaces formed of plastic materials of the type having high crystallinity and small surface polarity. The primary paint or primer surfacer composition of this invention thereby promotes superior interlayer adhesion to various kinds of final coatings.

(Prior Art)

The adhesive capacity is usually inferior for paints applied to surfaces of a variety of plastic materials having high crystallinity or small surface polarity, such as polyacetal resins and polyester resins (polyethylene terephthalate, polybutylene terephthalate, complete aromatic polyesters and the like. To overcome this adhesion problem, these plastic materials have usually been subjected to physical or chemical surface treatments prior to painting. These conventional methods include mechanically roughing the material's surface (i.e., a physical technique), treating the surface with solvents (i.e., a chemical technique), and treating the surface with flame, ultraviolet rays, corona-discharge, plasma treatment, and the like (i.e., physical-chemical treatments). According to these prior methods, the surface of the plastic material is changed in quality so as to improve the adhesive capacity of paints.

As above described, these conventional methods in which the surface of the plastics is physically or chemically treated and then painted, have some significant disadvantages. For example, these conventional methods are usually time consuming and require a large expenditure of money. Also, the surface-treated portions actually cause surface deterioration. In view of the above, a primer paint or a primer-surfacer paint exhibiting a superior adhesive capacity by merely being applied according to normal painting techniques without requiring any surface treatment has been needed. Some primer-paints have already been put into practice. The following characteristics are required for these types of primer paint or primer surfacer paint:

(1) The surface and the interior region of the plastics must not be harmed.
(2) Superior interlayer adhesive capacity of the coated paint to the plastics must be achieved (for example, no separation according to a tape-separation test using 100 meshes of 1 mm).
(3) The coated film must be tough (e.g., little shrinkage and internal strain are produced in the coated film's formation).
(4) A wet-on-wet final coating msut be possible due to the primer paint's fast drying capacity.
(5) The coated film must exhibit high flexibility and be resistant to physical shocks (shocks and chipping).
(6) The coated film must be solvent-resistant, water-resistant (superior in adhesive capacity) and heat-resistant (including a heat-resistant cycle capacity).

However, it is difficult to promote high adhesive capacity without heat treatment for the above described plastics having a high crystallinity and a small polarity since such materials exhibit an inferior affinity to almost all materials. Actually, no primer paint or primer surfacer paint exhibiting a satisfactory adhesive capacity to polyacetal and polyester molded products, for example, without any surface treatment has been commercialized.

The above shown prior arts are disclosed in (1) T. Endo et al., J. Polym. Sci., Polym. Lett. Ed., 13, 193(1975), (2) J. Polym. Sci., Polym. Chem. Ed., 13, 2525(1975), (3) Makromol. Chem., 176, 2897(1975), (4) J. Polym. Sci., Polym. Chem. Ed., 14, 1735(1976), (5) Makromol Chem., 177, 3231(1976), (6) J. Polym. J., 13, 715(1981), (7) J. Poly. Sci., Polym. Chem. Ed., 19, 1283(1981), (8) Polym. J., 14, 485(1982), (9) J. Polym. Sci., Polym. Chem. Ed., 20, 2935(1982), (10) M. Shimbo, M. Ochi, Y. Shigeta, J. Appl. Polym. Sci., 26, 2265(1981), (11) M. Shimbo, M. Ochi, T. Inamura, M. Inoue, J. Mater. Sci., 20, 2965(1985), (12) S. P. Thimoshenko, J. N. Goodier, Theory of Elasticity, by McGraw-Hill, New York, 1970, (13) J. Polym. Sci., Polym. Lett. Ed., 18, 457(1900) and (14) ibid., 18, 771(1980).

The present invention was achieved in view of the above described need. Thus, it is an object of the present invention to provide a primer paint or a primer surfacer paint capable of sufficiently meeting the above described characteristic requirements for use on plastics of the type having a high crystallinity and a small surface polarity.

SUMMARY OF THE INVENTION

In order to solve the above described problems, a primer paint or a primer surfacer paint according to the present invention is characterized by a paint film which comprises the components (A) polyurethane resins, (B) open-ring expansion spiro-ortho-ester resins, (C) cellulose derivatives, and (D) hydroxyl group-contained surfactants as essential ingredients for forming it.

A primer paint or primer surfacer composition according to the invention preferably comprises the components (A) a polyurethane, (B) a spiro-ortho-ester resin being capable of the ring-opening expansion, (C) a cellulose derivative and (D) a surfactant having a hydroxy group. It still more preferably comprises 50 to 97 wt.% of (A), 2 to 40 wt.% of (B), 1 to 9 wt.% of (C) and 0.05 to 1 wt.% of (D), based on the total weight of (A), (B), (C) and (D).

It is preferred that (A) the polyurethane has a number-average molecular weight of 2,000 to 10,000, (B) resin has a spiro-ortho esterification degree of 250 to 500 g/eq and an epoxy value of zero to 5.0 g/eq and (C) the cellulose derivative has a hydroxy group content of 1 to 3 per 4 glucose units and a viscosity of 0.01 to 20.0 sec.

From a practical point of view, it is preferable that the composition further comprises a solvent and any insoluble component in the solvent is present in a particle size of 10 mirons or smaller, uniformly dispersed in the solvent.

The invention moreover provides a method for coating a plastic article with a paint, which comprises firstly coating the article with the composition as defined above and secondly with the paint.

The ingredients for forming a paint film of a primer paint or a primer surfacer paint according to the present invention are described. The ingredient (A) is characterized by a high adhesive capacity and a high elasticity and has a function of simultaneously enhancing an adhesive capacity to an article to be painted and a shock-resistance of the paint film. According to the present invention, polyurethane resins are used as the ingredient (A). The polyurethane resins include thermoplastic polyurethane resins and thermosetting polyurethane resins. In addition, the polyurethane resins include also every modified polyurethane resin as far as it mainly comprises polyurethane resins. However, in order to give a high adhesive capacity and a high elasticity to a paint film, thermoplastic polyurethane resins having a mean molecular weight ($\overline{Mn}$) of 2,000 to 10,000, preferably 4,000 to 7,000, are used. The ingredient (B) mainly gives to the paint film a non-shrinking capacity. The ingredient (B) shows a bridged structure due to an inner-molecular irreversible ring-opening in the presence of cationic catalysts to be expanded, whereby playing a part in the reduction of the shrinkage of paint film during the formation thereof, so that it exhibits an effective plasticizing effect even under the ring-closed condition in addition to the effect of simultaneously reducing an external stress and a residual strain (internal stress) of the film due to the shrinkage thereof. This ingredient comprises spiro-ortho-ester resins including 2,2-bis[4-(2,3-epoxypropoxy)phenyl]propane. 6-hexanolyd polyaddition product having the below shown formula.

paint. Hydroxyl group-contained reactive surfactants of fluorine system and silicone system having a capacity of adjusting a film surface and a reactive capacity are preferably used as the ingredient (D). Specific examples of hydroxyl group-contained reactive surfactants of fluorine system include hydroxyl group-introduced perfluoroalkyls while the concrete examples of hydroxyl group-contained reactive surfactants of silicone system include a hydroxyl group-introduced organocyloxane. Both hydroxyl group-contained reactive surfactants of fluorine system and those of silicone system having higher hydroxyl group values are more effective. A part of these hydroxyl groups is exposed on a surface of paint film under an uncombined state to give an excellent adhesive capacity to a final coating of paint.

These ingredients (A), (B), (C) and (D) lead to the formation of a paint film having excellent performance as a paint film and a superior adhesive capacity to an

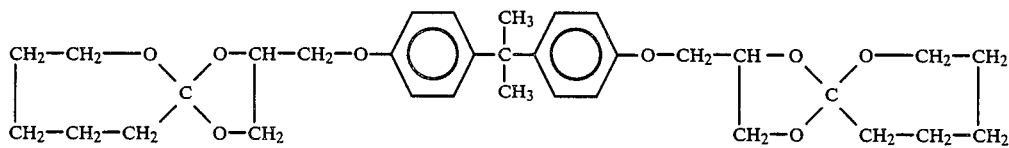

In addition, a compound having the below shown formula may be used.

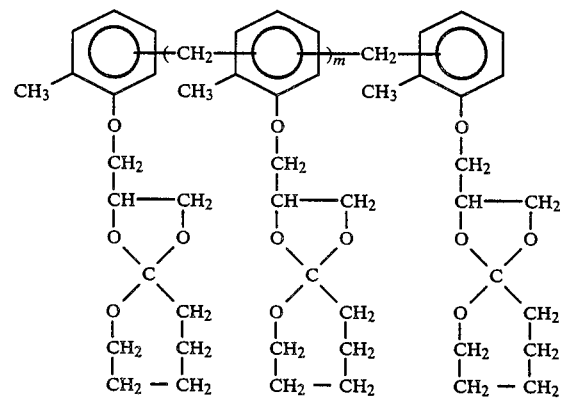

Moreover there may be used 8,10,19,20-tetraoxatrispiro[5.2.2.5.2.2.]heneicosan-2,14-dien and the like as typical examples. Of them, spiro-ortho-ester resins having a spiro-esterification degree of 250 to 500 g/eq, preferably 300 to 400 g/eq, and an epoxy value of 0 to 5.0 g/eq, preferably about 4.65 g/eq, are preferably used. The ingredient (C) aims at the provision of a film-forming capacity (thermal fluidity) of paints and a hardness to a paint film and consists of cellulose derivatives. Of them, cellulose esters, such as cellulose acetate, cellulose propyonate, cellulose butylate, cellulose acetate propyonate, cellulose acetate butylate and cellulose nitrate, are suitable for the object of the present invention. In particular, cellulose acetate butylate and cellulose acetate propyonate having a butylation degree or a propyonation degree of 17 to 55%, a hydroxyl group-concentration of 1.0 to 3.0, preferably about 1.0 (per four units of glucose anhydride) and a viscosity of 0.01 to 20.0 sec, preferably about 0.2 sec (standardized falling ball viscosity), are preferably used. The ingredient (D) aims at the adjustment of film surface and the provision of interlayer adhesive capacity to a final coating of article to be painted and to a final coating of paint.

According to the present invention, it is necessary that a primer paint or a primer surfacer paint comprises the ingredients for forming a paint film—(A) polyurethane resins, (B) spiro-ortho-ester resins, (C) cellulose derivatives and (D) hydroxyl group-contained surfactants—at the following ratios:

(A) polyurethane resins: 50 to 97% (by weight)
(B) spiro-ortho-ester resins (containing catalysts): 2.0 to 40% (by weight)
(C) cellulose derivatives: 1.0 to 9.0% (by weight)
(D) hydroxyl group-contained surfactants: 0.05 to 1.0% (by weight)

The reasons that the above described composition was selected are as follows:

(A) If polyurethane resins are present at ratios below 50% by weight, an adhesive layer for giving a high adhesive capacity is wanting, whereby the adhesive capacity is insufficient. If polyurethane resins are present at ratios exceeding 97% by weight, the corpusculization when sprayed, the surface flatness and the surface hardness extremely deteriorate.

(B) If spiro-ortho-ester resins are present at ratios below 2.0% by weight, their expanding capacity and plasticizing effect cannot be obtained and a primer paint or a primer surfacer paint becomes difficult apply at an edge (corner and side) portion of a molded product. On the other hand, if they are present at ratios exceeding 40% by weight, the adhesive capacity deteriorates.

The opening of a ring in spiro-ortho-ester resins is carried out by cationic ingredients in a system. Although usually the ring-opening reaction is promoted by the presence of catalysts such as methyl-hexahydrophthalic anhydride and di-n-butyl tin dilaurate, in some cases the opening of a ring is carried out by an action of —COOH group, —SO$_3$H group and the like in the system or fillers (aluminium silicate, magnesium silicate, surface carboxyl type organic micro gel and the like) having acidic hydroxyl groups contained therein.

Also a superior plasticizing effect under the ring-closed state appears. Since this ring-opening reaction is difficult to initiate at room temperature, usually the paint is subjected to a heat treatment at about 100° C. after the paint's application. The ring-opening reaction may alternatively be promoted utilizing heat during the baking of a final coating of paint.

The above shown ring-opening reaction using an anhydride is illustrated below.

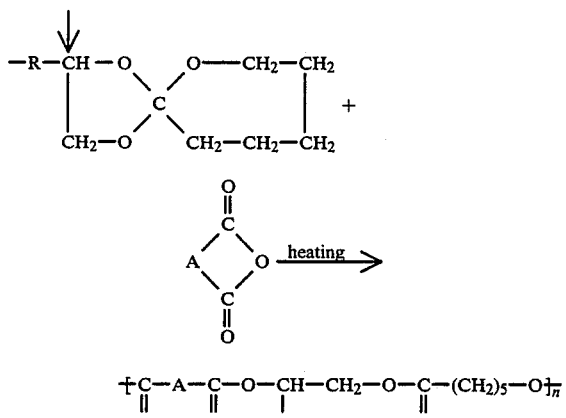

(C) If cellulose derivatives are present at ratios below 1.0% by weight, their effects of thermal fluidity and surface hardness are insufficient. If they are present at ratios exceeding 9.0% by weight, their adhesive capacity deteriorates.

(D) If hydroxyl group-contained reactive surfactants are present at ratios below 0.05% by weight, their surface-adjusting effect is not apparent whereby the surface of a paint film is inferior in flatness. However, if they are present at ratios exceeding 1.0% by weight, defects (craters and the like) are generated in the resulting paint film and the adhesive capacity to the final coating of paint deteriorates.

In addition, the primer paint or primer surfacer paint comprising the above described four kinds of ingredients can form a paint film meeting the above described requirements by thermal after-treatment so as to react the ingredients (B), (C) and (D). In this sense, it is most advantageous to use these ingredients for forming a paint film in combination with thermosetting type final paint coatings, such as baking paints and to use heat during the baking thereby promoting the bridging (cross-linkage) of the ingredients for forming the paint film. However, it goes without saying that the primer paint or a primer surfacer paint can be subjected to heat treatment after its application and then coated with a final coating of paint of the type that is cured at ambient ("room") temperature.

The four kinds of ingredients mentioned previously can also be combined with the final paint coating of the type that is set at room temperature within the above described range of composition. In such a case, the entire primer and paint system may be cured at room temperature.

Pigments, fillers and various kinds of additives may optionally be added to the composition of this invention. These additives are of the type which may be employed in conventional paint compositions so to improve its physical properties, ultraviolet ray permeability, electrical conductivity, coloring capacity and the like. These additives may also be present in the compositions of this present invention so as to enhance the performance of the resulting paint film. However, it goes without saying that the kind and the quantity of the added pigments, fillers and the like must be determined so that they are compatible with the ingredients (A), (B), (C), (D) mentioned previously for forming a film of a primer paint or a primer surfacer paint.

The ingredients for forming a paint film and other additives, such as pigments, are diluted with solvents and blended to obtain the primer paint or primer surfacer paint. It goes without saying that the solvents must not attack the plastic material's surface of the articles to be painted, and preferably have a fast drying capacity. Although the solvents are selected according to the kind of articles to be painted, the most popular ones are shown in the left column of Table 2 and mixtures thereof.

It is desirable that insoluble ingredients of the ingredients for forming the paint film, pigments and other additives have grain sizes of 10 $\mu$m or less so as to be uniformly dispersed in the solvent. The primer paint or primer surfacer paint according to the present invention can be provided in the form of solution type paints or dispersion type paint by suitably controlling the kind and the quantity of the added solvents.

Painting methods, such as air spray painting, immersion painting, electrostatic painting, airless painting, roller painting, curtain painting and shower painting, can be used by adjusting the paints viscosity, electric conductivity and the like. After painting, the resulting paint film is hardened by drying at ambient temperature and drying with hot air for an optional time. Hot air drying is preferably carried out for 5 to 20 minutes at 40° to 140° C. and the thickness of the dried paint film is 15 to 30 $\mu$m. It may be thought that the standard thickness is 22±2 $\mu$m.

Airless painting is conducted by forcing it through an orifice at a high pressure.

(Preferred Embodiments)

A primer paint or a primer surfacer paint having the compositions as shown in the following Table 1 was prepared and then diluted with a solvent mixture having compositions as shown in Table 2. The diluted paint was applied on a plate made of polyacetal, polyethylene terephthalate, polybutylene terephthalate and complete aromatic polyesters (constituent monomer unit:

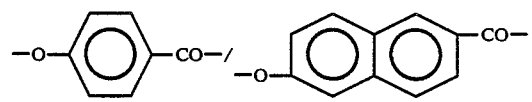

=70/30) in a dried film thickness of 22±2 $\mu$m and then dried with hot air for 20 to 30 minutes at paint film temperatures of 80° to 140° C. to thermally set the ingredients for forming a paint film. Subsequently, a melamine-alkyd paint (AMILAC manufactured by Kansai Paint Co., Ltd.) on the market as a final coating of paint for use in an outside plating of cars was applied on the thermally set primer paint or primer surfacer paint in a dried film thickness of 30 to 40 $\mu$m by spraying, set for 10 minutes and then dried with a hot air for 30 minutes at 140° C.

The ingredients shown in the left column of Table 1 are the following substances.

VERNOC: (A) polyurethane resin (manufactured by Dainihon Ink Chemical Co., Ltd.)

exp-101: (B) spiro-ortho-ester resin (catalyst: di-n-butyl tin dilaurate) (manufactured by Toa Gosei Chemical Co., Ltd.)

CAB-551-0.2: (C) cellulose acetate butylate (manufactured by Eastman Kodack Co., Ltd.)

Difenser

MCF-312: (D) hydroxyl group-contained fluorine reactive surfactant (manufactured by Dainihon Ink Chemical Co., Ltd.)

BYK No-370: (D) hydroxyl group-contained silicon reactive surfactant (manufactured by BYK Chemie AG)

TABLE 1

| Composition | Preferred embodiment 1 | Preferred embodiment 2 | Preferred embodiment 3 | Preferred embodiment 4 | Preferred embodiment 5 | Preferred embodiment 6 |
|---|---|---|---|---|---|---|
| VERNOC | 78.3 | 36.1 | 38.7 | 31.8 | 38.7 | 31.8 |
| Exp-101 | 15.7 | 7.3 | 4.4 | 6.5 | 4.4 | 6.5 |
| CAB-551-0.2 | 2.9 | 1.4 | 3.2 | 1.3 | 3.2 | 1.3 |
| Difenser-MCF-312 | 0.2 | 0.2 | 0.2 | 0.2 | — | — |
| BYK No-370 | — | — | — | — | 0.2 | 0.2 |
| Titanium oxide (Rutile) | — | 35.9 | 38.1 | 31.8 | 38.1 | 31.8 |
| Zinc oxide | — | 6.3 | 10.1 | 5.6 | 10.1 | 5.6 |
| Magnesium silicate | — | 6.4 | — | 16.8 | — | 16.8 |
| Aluminium silicate | — | — | 2.1 | — | 2.1 | — |
| Carbon black | — | 0.4 | 1.0 | 0.4 | 1.0 | 0.4 |
| i-butanol | — | 6.0 | — | — | — | — |
| n-butanol | 2.9 | — | 2.2 | 5.6 | 2.2 | 5.6 |
| Diluent solvent | (I) | (II) | (III) | (IV) | (V) | (VI) |
| Total (excepting diluent solvent) | 100.0 | 100.0 | 100.0 | 100.0 | 100.0 | 100.0 |

TABLE 2

| Solvents | Mixing ratio of diluent solvents (wt. %) | | | | | |
|---|---|---|---|---|---|---|
| | (I) | (II) | (III) | (IV) | (V) | (VI) |
| Methylethylketone | 30 | 30 | 30 | 50 | 30 | 30 |
| Methyliso-butylketone | 20 | 20 | — | — | — | 20 |
| i-propanol | 20 | 15 | 45 | — | 20 | — |
| i-butanol | — | — | — | 10 | — | — |
| Ethyl acetate | — | — | — | 25 | — | — |
| Butyl acetate | 5 | 5 | 5 | — | — | — |
| Methyl celosolv | — | — | — | — | 15 | — |
| Methyl celosolv acetate | — | — | — | — | — | 25 |
| Ethyl celosolv | 10 | — | — | — | 25 | — |
| Ethyl celosolv acetate | — | 10 | — | 15 | — | — |
| Butyl celosolv | — | — | 10 | — | 10 | — |
| Butyl celosolv acetate | 15 | — | — | — | — | 25 |

The primer paint or the primer surfacer paint having the above described compositions satisfied the following requirements:

(1) It does not injure the surface and the interior of plastics.
(2) It is superior in interlayer adhesive capacity after finally coated (there is no separation in the tape-separation test using 100 meshes of 1 mm).
(3) It forms a tough paint film (the shrinkage and the internal strain during the formation of film are small).
(4) It is fast dried and can be finally coated in a wet-on-wet manner.
(5) It forms a paint film having a high flexibility and a high physical shock-resistance (shock-resistance and chipping-resistance).
(6) It forms a paint film superior in water-proofness (adhesive capacity) and heat-resistance (heat cycle-resistance).

(Comparative Example)

A polyacetal resin plate was subjected to only a final coating in the preferred embodiment without using the primer according to the present invention and tested on adhesive capacity (the tape-separation test using 100 meshes of 1 mm) in the same manner as in the preferred embodiment, for reference. 100 meshes were all separated.

In addition, the primers, which were obtained by removing any one of the ingredients A, B, C, D from the primer (Preferred Embodiment 1) comprising the ingredients A, B, C, D according to the present invention were tested on separation in the same manner as in the preferred embodiment. Average residual adhesion coefficients (average numbers of residual adhesion meshes of 100 meshes tested on adhesive capacity by the tape-separation test) were as follows:

| | |
|---|---|
| In the case where the ingredient A is not contained: | 0/100 meshes |
| In the case where the ingredient B is not contained: | 20/100 meshes |
| In the case where the ingredient C is not contained: | 32/100 meshes |
| In the case where the ingredient D is not contained: | 7/100 meshes |

As above described, the primer paint or the primer surfacer paint comprising (A) polyurethane resins, (B) open-ring expansion spiro-ortho-ester resins, (C) cellulose derivatives and (D) hydroxyl group-contained reactive surfactants as essential ingredients for forming a paint film according to the present invention exhibits a superior adhesive capacity to a surface of plastics having a high crystallinity and or a small surface polarity without requiring the conventional chemical and physical surface treatment processes and a superior interlayer adhesive capacity to various kinds of final coating of paint. Thus, the primer paint or the primer surfacer paint according to the present invention is remarkably useful for polyacetal resins, polyester resins (polyethylene terephthalate, polybutylene terephthalate, complete aromatic polyesters and the like) and the like.

What is claimed is:

1. A primer paint or primer surfacer composition which comprises the components: (A) 50 to 97 wt.% of a polyurethane, (B) 2 to 40 wt.% of a spiro-ortho-ester resin capable of undergoing a ring-opening expansion, (C) 1 to 9 wt.% of a cellulose derivative, and (D) 0.05 to 1 wt.% of a surfactant having a hydroxy group.

2. A composition as claimed in claim 1, in which the polyurethane of component (A) has a number-average molecular weight of 2,000 to 10,000, the resin of component (B) has a spiro-ortho esterification degree of 250 to 500 g/eq and an epoxy value of zero to 5.0 g/eq, and the cellulose derivative of component (C) has a hydroxy group content of 1 to 3 per 4 glucose units and a viscosity of 0.01 to 20.0 sec.

3. A composition as claimed in claim 1, which further comprises a solvent.

4. A method for coating a plastic article with a paint, which comprises first coating the article with the composition as defined in claim 1 and second with the paint.

5. A composition as claimed in claim 3 wherein any component which is insoluble in the solvent is present in the form of particles uniformly dispersed in the solvent and having a particle size of 10 microns or less.

* * * * *

UNITED STATES PATENT AND TRADEMARK OFFICE
CERTIFICATE OF CORRECTION

PATENT NO.    : 4,780,340
DATED         : October 25, 1988
INVENTOR(S)   : TAKAHASHI et al It is certified that error appears in the above-identified patent and that said Letters Patent is hereby corrected as shown below:

Column 1, line 18, after "like" insert a parenthesis --)--.

Column 3, line 18, change "propane. 6-hexanolyd" to --propane·6-hexanolyd--.

Column 6, line 30, after "the", delete "paints" and insert --paint's--.

Column 7, line 3, change "exp-" to --Exp---.

Signed and Sealed this

Seventh Day of March, 1989

Attest:

DONALD J. QUIGG

*Attesting Officer*    Commissioner of Patents and Trademarks